Figure 1:
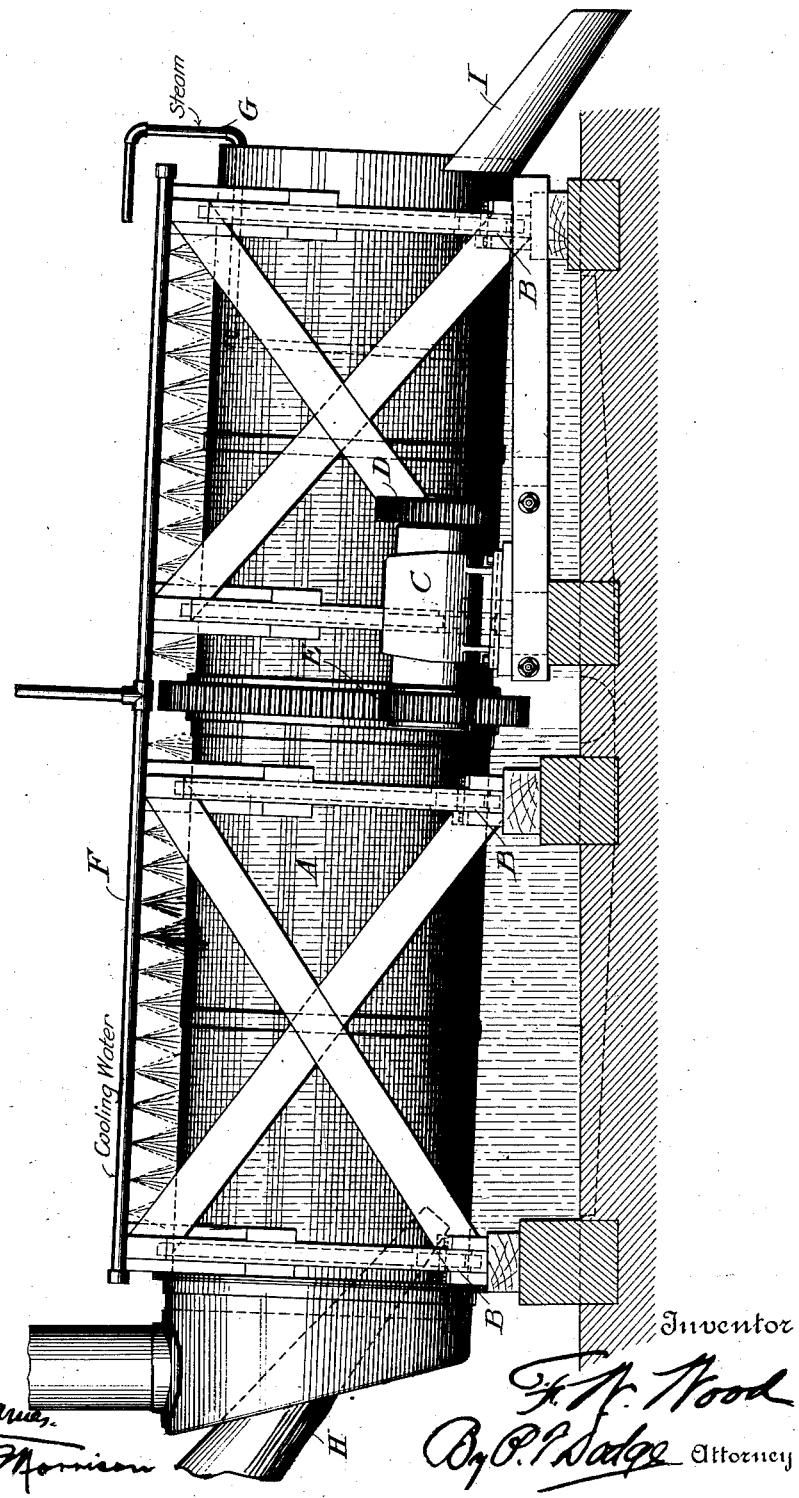

No. 883,770. PATENTED APR. 7, 1908.
F. W. WOOD.
METHOD OF TREATING BLAST FURNACE SLAG.
APPLICATION FILED NOV. 8, 1905.

2 SHEETS—SHEET 1.

No. 883,770. PATENTED APR. 7, 1908.
F. W. WOOD.
METHOD OF TREATING BLAST FURNACE SLAG.
APPLICATION FILED NOV. 8, 1905.

2 SHEETS—SHEET 2.

UNITED STATES PATENT OFFICE.

FREDERICK WILLIAM WOOD, OF BALTIMORE, MARYLAND.

METHOD OF TREATING BLAST-FURNACE SLAG.

No. 883,770.          Specification of Letters Patent.          Patented April 7, 1908.

Application filed November 8, 1905. Serial No. 286,347.

*To all whom it may concern:*

Be it known that I, FREDERICK WILLIAM WOOD, of Baltimore, State of Maryland, have invented a new and useful Improvement in Methods of Treating Blast-Furnace Slag, of which the following is a specification.

Ordinarily the disposal of blast furnace slag is attended by considerable expense, to offset which efforts have been made to utilize it as a material for road-ballast, roofing material, and in the manufacture of cement. For each of these purposes it is necessary that the slag shall be sub-divided to a greater or less extent. The usual method of preparation for cement making is to bring the molten slag from the furnace into contact with a large volume of water, the result being the formation of a cellular, vitreous mass, which after being dried is ground to a fine powder. During this treatment the slag takes up a large percentage of water, frequently as high as twenty-five per cent., demanding the consumption of a large amount of fuel in order to dry it thoroughly, as is necessary preparatory to use. The molecular condition of the slag, resulting from the sudden chill in the water, is not that best suited for the production of high grade cement.

The aim of my invention is to avoid the expense attending the ordinary procedure, and at the same time convert the material to a peculiar crystalline condition better adapted for the manufacture of cement and for other uses,—a vitreous or inert condition being carefully avoided.

To secure the crystalline state essential to the highest cementing qualities, the slag must be held in a pasty condition, that is to say, between the solid and liquid state, for a considerable time, usually for some minutes. This is best accomplished by delivering the molten slag upon a cooling surface of such form and moving in such manner that the slag will be divided into pasty nodules, and these nodules tumbled over and over in contact with one another so as to prevent them from adhering or re-agglomerating and thus prolonging the cooling action. The tumbling action is continued as the material slowly changes condition until it finally assumes the form of hard separate nodules. The sub-division is effected by repeated contact of molten slag with portions previously chilled by contact with the cold surface. The action produces a flowing, tumbling, pasty mass, which, as the cooling progresses, separates into nodules, which are prevented from clinging together, as they would otherwise do, by their constant change of position.

In order to effect the tumbling action and the progressive movement of the material toward the point of delivery, as the change of condition progresses, I may employ any suitable apparatus, preferably an inclined rotary tube or barrel or circular or polygonal section, into and through which the material is caused to flow from one end to the other. The rotary motion of the supporting surface in a direction transverse to the flow of the material thereover, results in a constant agitation and a tumbling motion of the material, which is repeatedly lifted and caused to fall back upon the moving mass below while advancing slowly toward the point of discharge. The operation may be continuous, but the change in the character of the material is progressive and may be controlled and prolonged by changing the inclination and the speed of rotation of the tube or barrel.

The prolongation of the cooling period, or the period consumed in changing the material from a pasty to a solid state, is of importance. In practice, it may be extended with advantage to several minutes. Unless gradually or progressively cooled, the material will assume a vitreous or inert condition.

In carrying out my method, the slag remains in contact with the cooling surface for an instant only at a time, and the thin skin thereby formed on the nodule is brought back toward the molten or pasty condition again by contact with the more highly heated portions of the mass. Thus sudden solidification is prevented, while at the same time the agitation of the mass prevents the nodules from cohering. The operation is facilitated by subjecting the material, during the above action, to an artificial cooling influence. This may be effected by flowing cold water or other cooling fluid around the exterior of the cylinder, the effect being not only to reduce the temperature of the contained air but also the temperature of the surface on which the material rests, and with which the particles are brought successively in contact as the stream flows toward the delivery end. As the slag passes from the liquid to a pasty condition and thence to the solid state, the constant agitation insures its separation into small pieces or nodules, the size being governed by the rate of rotation and the rate of cooling. By the gradual cooling a molecular condition is obtained preferable for cement making purposes to the vitreous condition produced by sudden cooling. Moreover, the slag is obtained in a form in which it can be used without subsequent treatment other than separating the sizes suitable for the purpose desired.

In some cases it is advantageous to subject the mass while cooling to the action of a strong current of air. This may be accomplished by any suitable means, such for example as a jet acting at either end of the cylinder to induce currents of air therethrough. In such case the cooling is accomplished, first, by contact with the cold supporting surface of the chamber; second, by radiation to the cold walls around and above the mass, and, third, by the cooling current above mentioned.

The slag as it leaves the blast furnace contains from one and one-half per cent. of sulfur to three per cent.; the combination present is sulfid of calcium. The presence of this compound in cement is highly objectionable from the fact that it is slowly oxidized to sulfate of calcium by the action of atmospheric air, the change being accompanied by an increase of volume, which disintegrates the mortar or concrete. By exposure of the highly heated slag, as hereinbefore described, to the oxidizing influence of the passing air, a considerable portion of the sulfurous contents is oxidized, partly to sulfurous anhydrid, which passes away as a gas, and partly with the formation of sulfate of calcium, the presence of which in cement is not objectionable.

The accompanying drawings illustrate an apparatus suitable for carrying out my invention.

Figure 2:
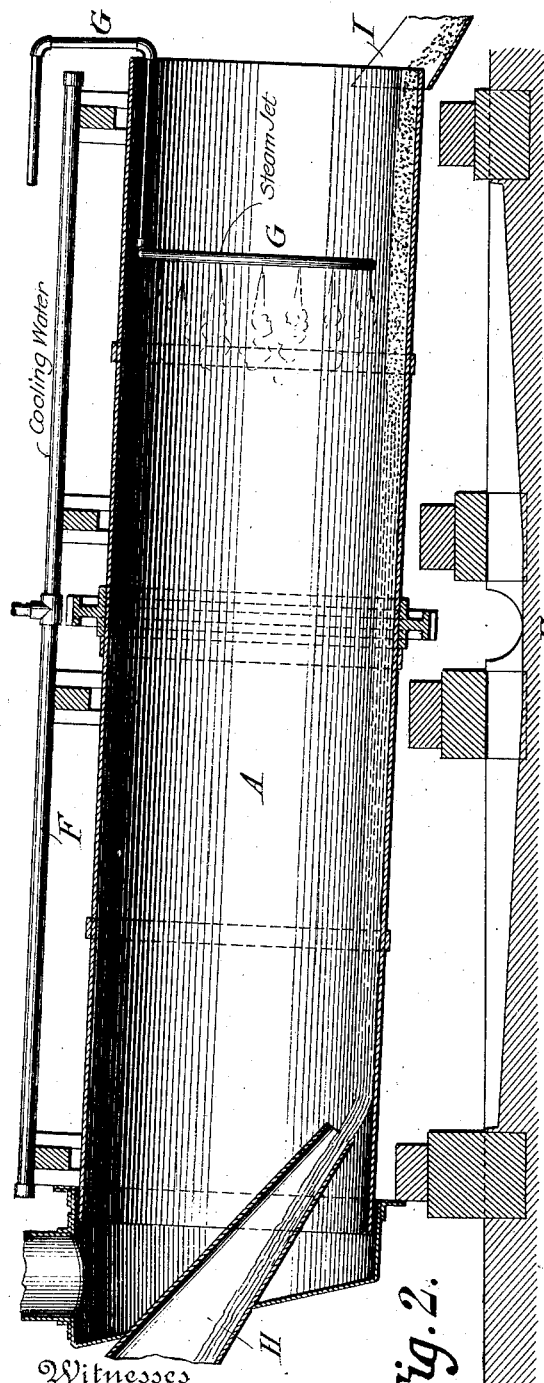
Figure 3:
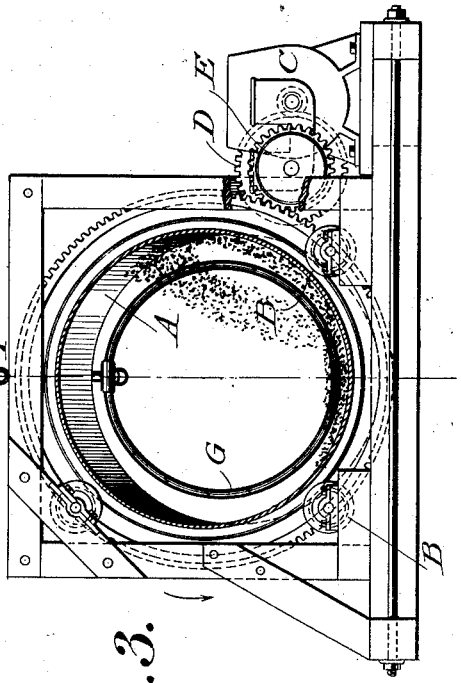

Figure 1 is a side elevation, of a rotary cylinder and attendant parts suitable for carrying out my method. Fig. 2 is a longitudinal vertical section of the same on the line 2—2, Fig. 3. Fig. 3 is an end elevation of the cylinder and the parts for supporting and turning the same.

Referring to the drawings A represents an inclined tubular body, which may have a circular section as shown or a polygonal section having its inner surface smooth or roughened as may be preferred. This cylinder is supported on fixed rollers, B, lying beneath it and circumferentially grooved.

Motion may be communicated from any suitable source and through any suitable mechanism. I recommend, as shown, an electric motor, C, from which motion is communicated through an intermediate gear, D, to a driving wheel, E, engaging a flange or ring surrounding the cylinder. This may be plain or toothed as preferred.

F is a perforated pipe fixed in position from the rotary cylinder or body, and communicating with a pump, reservoir, or other source of supply for showering cold water on the outside of the cylinder when required.

G is a stationary pipe located in the lower end of the cylinder and perforated for the purpose of delivering jets toward the receiving end of the same. This pipe may be connected with a fan or other source of cold air supply, or with a source of high pressure steam supply, in order that the dry steam issuing therefrom may induce a flow of air longitudinally through the cylinder and over the surface of the material flowing downward therein.

H is a chute through which the molten slag is delivered into the upper end of the cylinder.

I is a conductor through which the nodules are delivered from the cylinder.

The apparatus constitutes no part of the present invention, and may be modified at will or replaced by any other form of apparatus which will subject the slag to the influences above described.

Having described my invention, what I claim is:

1. The method of treating blast furnace slag consisting in subjecting the same to continuing agitation during its gradual change from a fluid to a solid state.

2. The method of treating blast furnace slag consisting in subjecting the same to agitation of the pasty nodules in contact with one another and to a progressive movement during its change from a fluid to a solid state.

3. The method of treating molten blast furnace slag consisting in delivering the same upon a cooling surface and tumbling the resulting pasty nodules over and over in contact with one another until they assume a solid condition.

4. The method of converting molten slag into solid nodules, consisting in flowing the material forward over a cooling surface and at the same time tumbling the mass over and over in a direction transverse to the flowing movement, to cause repeated contact of the nodules while changing from a pasty to a solid state.

5. The method of treating molten furnace slag consisting in flowing the same gradually downward over an inclined cooling surface, and at the same time lifting the surface transversely to the line of flow; whereby the advancing nodules are caused to repeatedly tumble back upon one another while passing from a fluid to a solid state.

6. The method of treating molten blast furnace slag consisting in flowing the same over an artificially cooled moving surface while passing from a fluid to a solid state.

7. The method of treating molten blast furnace slag consisting in flowing the same over a moving surface subject to the influence of a cooling current while passing from a fluid to a solid state.

In testimony whereof I hereunto set my hand this first day of November, 1905, in the presence of two attesting witnesses.

FREDERICK WILLIAM WOOD.

Witnesses:
 THOS. KELL BRADFORD,
 AUG. W. BRADFORD.